United States Patent Office 3,253,637
Patented May 31, 1966

---

3,253,637
TIRES
John W. Liska, Cuyahoga Falls, Ohio, assignor to The Firestone Tire & Rubber Company, Akron, Ohio, a corporation of Ohio
No Drawing. Filed Aug. 17, 1964, Ser. No. 390,200
4 Claims. (Cl. 152—357)

This invention relates to pneumatic tires having, as their primary reinforcement, plies of nylon tire cord, and in particular to such tires having minimal flat-spotting and rapid run-out of such minimal flat-spotting. The invention also relates to processes for the production of such tires and the continued maintenance of their desirable properties.

A number of different nylon compositions have been used in the production of tire cord. The use of nylon tire cord has, however, been limited as a result of a phenomenon commonly referred to as "flat-spotting." When a vehicle stands for an extended period of time, those positions of the tire which are in contact with the ground flatten. The flattened portion tends to be retained for substantial periods of time after the vehicle is in operation. As the tire rotates, there is a decided thumping or slapping sound resulting from the flat spot on the tire. With many tire cords other than nylon, what little flat spot forms runs out quickly. However, the properties of nylon cord are such that the flat-spotting is retained substantially longer than with tires utilizing other tire cord materials. A test has been developed and is described hereinbelow for the objective and quantitative measurement of the flat-spotting of a given tire. In general the test involves operating the tire, while mounted on an automobile suspension, under simulated smooth road conditions, and measuring the accelerations of the axle upon which the tire is rotating. A conventional nylon tire characterized by objectionable flat-spotting will commonly show, at the beginning of a run, accelerations on the order of 3.3–5.5 $g$ ($g$=acceleration corresponding to the earth's gravity), and the run-out time, i.e., the time required for the accelerations to diminish to an acceptable value, say under 3.0 $g$, will be quite protracted. By way of contrast, desirably a tire should have less than 3.0 $g$ initial acceleration and a run-out time of less than 5 minutes.

It is known that nylon tire cord, depending upon its history of exposure to atmospheres of various humidities, will contain greater or lesser proportions of moisture absorbed therein. Commonly a random sample of nylon cord as ordinarily received will contain on the order of 3% of moisture. It has been recommended, in order to minimize the flat-spotting of tires made from nylon, that the cord be desiccated as far as possible before tires are fabricated therefrom. Along the same line, it has also been suggested that the completed fabricated tires be subjected to heating in a drying oven for a protracted period in order to dry out the reinforcing cords embedded therein. Such measures do indeed substantially decrease the flat-spotting of the tires, but the procedures involved are obviously impractically cumbersome. Moreover the effect achieved is at best transient, since the tires will inevitably regain moisture from the atmosphere and will eventually be indistinguishable from tires which were originally made from ordinary moisture-containing nylon, which has equilibrated with the atmosphere.

Accordingly, it is an object of this invention to provide nylon-reinforced pneumatic tires having only minimal flat-spotting tendencies, and rapid run-out of said flat-spotting.

Another object is to provide practical processes for the achievement of tires of the desirable characteristics cited.

A further object is to provide means for maintaining the desirable characteristics of minimal flat-spotting and rapid run-out in such tires.

It has surprisingly been found, in accordance with this invention, that if, instead of desiccating nylon tire cord used in a pneumatic tire to values substantially below its usual content in equilibrium with the atmosphere (as heretofore recommended), the moisture in the nylon is artificially increased substantially above its normal equilibrium value, say to values of 4.0, or preferably 4.5%, or greater, of moisture based on the weight of the nylon, the tires containing such cord as primary reinforcement will be characterized by low values of initial flat-spotting and by a rapid run-out of such flat-spotting. The requisite moisture can be introduced into the cord in a number of ways: for instance, the cord, before being fabricated into the tires, may be deliberately moistened with sufficient water to bring the moisture content up to the ranges desired (say greater than 4%, or preferably greater than 4.5%; amounts ranging from these values up to as high as 7 or 8% will be accepted and operable); alternatively tires constructed without any artificial moistening of the cord before incorporation into the tires may be exposed to humid or wet conditions, where the partial pressure of water vapor is higher than is normal in the atmosphere and therefore drives a greater quantity of moisture into the cord than when it is in equilibrium with ordinary atmospheres.

In order that this effect will not be dissipated in time, it is desirable to provide means associated with the tire whereby moisture is maintained in the tire cord during storage, transportation, and use. To this end, the inflating gas contained in the interior of the tire is maintained, in accordance with one aspect of the invention, saturated with respect to water vapor. Conveniently this is done by maintaining a small amount of liquid water within the interior of the tire. For instance, garages servicing these tires should provide for the deliberate inclusion of slugs, drops or a mist of water in the air used for inflating the tires of this invention. This could be done, for instance, by providing an aspirator in the air line. Alternatively, water could be introduced separately into the tires at each periodic servicing of the vehicles on which the tires are mounted. In this way, as water diffuses out of the cords during storage and use of the tires, additional water is supplied thereto from the saturated inflating gas in the interior of the tire, so that the initial good properties of the tire are continuously maintained.

A number of types of nylon have been used in tire cord, and the invention may be practiced with any of these. The invention finds especial application in connection with tires embodying cord made of nylon–6, as the improvement in flat-spotting characteristics of tires made from this type of cord are outstandingly improved by the practice of this invention. However, remarkable improvement is also secured in the case of other nylons, for instance nylon–66, polyhexamethylene adipamide; nylon–7, polyoenantholactam; nylon–4, polybutyrolactam; and nylon–5, polyvolerolactam, as well as with blends of the various nylons, e.g. a blend of nylon–6 and nylon 6I (polyhexamethylene isophthalamide).

Reference was made above to a test for the measurement of flat-spotting. In accordance with this test, the tire is mounted on a wheel, inflated to rated pressure, and then "warmed up" by mounting the wheel on a rotary arbor and driving the tire at a peripheral speed of 80 miles per hour by means of a power-driven drum bearing against the tread of the tire with a force equal to the rated load for that tire. The wheel is then removed from the warm-up equipment and bolted onto a fixed arbor in a room at 25° C. A flat plate is then pressed against the tread of the tire with a force equal to the service load for which the tire is rated. This condition is maintained for a predetermined length of time (e.g., 17 hours, to simulate overnight parking). A flat spot is thereby developed on the tire.

Thereafter the pressure on the flat plate is released, and the wheel and tire mounted thereon is transferred to the right front wheel position of a Ford 1964 Galaxie Fordor Sedan. The axle of this wheel has an accelerometer thereon, and the tire bears with full normal wheel load upon a power-driven rotating drum disposed in a pit under the wheel. The test is started at standstill. Power is then applied so as to rotate the drum, which in turn frictionally drives and rotates the wheel. Peripheral speed is brought up to 30 miles per hour as quickly as possible, and as soon as this speed is attained, the maximum vertical accelerations of the vehicle front wheel axle are observed. This acceleration, in units of $g=32$ ft./sec.$^2$, is recorded as the "Initial Axle Acceleration." Speed is maintained at 30 miles per hour and maximum acceleration observed at intervals of interest.

The tires involved in the tests described below were all 7.50 x 14 tires of the construction and formulation of the Firestone "Nylon 500" tire, containing four plies of 840/2 nylon tire cord.

With the foregoing general discussion in mind, there are given herewith detailed examples of the practice of the invention.

*Example I.—Steam autoclave introduction of moisture*

A Firestone "Nylon 500" 7.50 x 14 tire containing four cord plies of nylon–6 was placed in an autoclave and subjected to saturated steam at 270° F. for one half hour. The tire was then removed and cooled, and subjected to the flat-spotting test described above. The wheel was left on the fixed arbor during the flat-spot development stage for 18 hours. Taking an average of tests conducted on four different tires, the initial acceleration was 2.8 $g$. In parallel tests conducted on these untreated tires, the initial acceleration averaged 3.5 $g$. Moreover, the run-out on the treated tires was excellent: after three minutes at 30 miles per hour, the average axle acceleration of the four tires had dropped to 1.6 $g$ and after 10 minutes to 1.2 $g$.

*Example II.—Inclusion of water during manufacture*

A series of tires were constructed to the design of the Firestone "Nylon 500" tire, containing four cord plies of nylon–6. Varying amounts of water, or no water at all, were introduced into the cords just prior to calendering and tire building. The tires were then subjected to the flat-spotting test described above. The tires were left on the flat-spot developing arbors for 17 hours. Following are the results of the tests.

TABLE I

| Water Content of Tire Cord (percent based on weight of cord) | Axle Acceleration ($g$) | |
|---|---|---|
| | Initial | After 5 min. at 30 m.p.h. |
| 3.2* | 4.2 | 1.9 |
| 4.5 | 2.9 | 1.5 |
| 7.0 | 2.9 | 1.2 |

*A production tire contains moisture from equilibrium with atmosphere. No supplemental water added.

The superior flat-spotting performance of the tires into the cord of which water was artificially introduced is quite evident, both on initial acceleration and 5-minute run-out.

*Example III.—Room temperature diffusion introduction of moisture*

Two tires were constructed to the design of the Firestone "Nylon 500" tire, one using nylon–6 cord and the other using nylon–66 cord. The two tires were initially desiccated in an oven at 245° F. for 1 hour. The tires were then run through the flat-spotting test described above. Next, the tires were deflated, one pint of distilled water was introduced into the interior of each of the tires, and the tires reinflated. They were then placed in storage at 25° C., and rolled around each day to insure even distribution of the water. Flat spot tests were run at weekly intervals. Following are the results:

TABLE II

| Material of Cords | Before Adding Water | Initial Acceleration ($g$) After Storage For— | | | | |
|---|---|---|---|---|---|---|
| | | 1 week | 2 weeks | 3 weeks | 4 weeks | 5 weeks |
| Nylon-6 | 2.9 | 3.1 | 3.15 | 3.5 | 3.3 | 2.6 |
| Nylon-66 | 2.1 | 3.0 | 3.2 | 2.8 | 2.7 | 2.7 |

The good flat-spotting results obtained by desiccating the tires in accordance with conventional recommendations will be evident from the first column of the table. However, as the water diffuses into the tire structure the flat-spotting becomes worse, increasing to a maximum at two weeks for nylon–66 and at three weeks for nylon–6. Thereafter the trend, surprisingly, reverses and as the tire equilibrates with the water-vapor-saturated inflation gas, achieves very satisfactorily low values of flat-spotting.

From the foregoing general discussion and detailed experimental examples, it will be seen that this invention provides novel nylon cord pneumatic tires characterized by greatly reduced flat-spotting, and by rapid run-out of the degree of flat-spotting that is not eliminated. The processes and manipulations involved are simple and inexpensive.

What is claimed is:

1. Method of building a pneumatic tire characterized by minimal flat-spotting and rapid run-out of said flat-spotting, which comprises introducing, into a nylon tire cord, at least 4.0% of moisture, based on the weight of the cord, and building therewith a pneumatic tire having said cord as its primary reinforcement.

2. Process according to claim 1, wherein the nylon in said tire cord is nylon–6.

3. Process according to claim 1, wherein the nylon in the tire cord is nylon–66.

4. Process according to claim 1, wherein the tire cord is a blend of a nylon and a poleyster.

References Cited by the Examiner

UNITED STATES PATENTS 2,847,049  8/1958  Blomquist _____ 152—330
2,991,818  7/1961  Gay et al. _____ 152—356
3,113,886  12/1963  Kolb _____ 156—110

ARTHUR L. LA POINT, *Primary Examiner.*

C. W. HAEFELE, *Assistant Examiner.*